United States Patent [19]

Myers et al.

[11] 4,145,380

[45] Mar. 20, 1979

[54] VINYL HALIDE POLYMER IMPACT MODIFIERS

[75] Inventors: Robert M. Myers, Philadelphia; David L. Dunkelberger, Levittown, both of Pa.; Daniel T. Carty, Willingboro, N.J.

[73] Assignee: Rohm and Haas Company, Philadelphia, Pa.

[21] Appl. No.: 650,480

[22] Filed: Jan. 19, 1976

Related U.S. Application Data

[60] Division of Ser. No. 494,810, Aug. 5, 1974, Pat. No. 3,971,835, which is a continuation of Ser. No. 184,913, Sep. 29, 1971, abandoned, which is a continuation-in-part of Ser. No. 56,007, Jul. 17, 1970, abandoned.

[51] Int. Cl.$^2$ .................. C08F 257/02; C08F 265/06; C08F 291/02; C08F 291/06
[52] U.S. Cl. ..................................... 260/879; 260/885
[58] Field of Search ............................... 260/885, 879

[56] References Cited

U.S. PATENT DOCUMENTS

| | | | |
|---|---|---|---|
| 3,290,265 | 12/1966 | Kaneko | 260/885 |
| 3,448,173 | 6/1969 | Ryan et al. | 260/876 |
| 3,502,745 | 3/1970 | Minton | 260/885 |
| 3,520,838 | 7/1970 | Burke | 260/876 |
| 3,538,194 | 11/1970 | Barrett et al. | 260/879 |
| 3,971,835 | 7/1976 | Myers et al. | 260/885 |

FOREIGN PATENT DOCUMENTS

| | | | |
|---|---|---|---|
| 635141 | 1/1962 | Canada | 260/879 |
| 2324316 | 10/1974 | Fed. Rep. of Germany | 260/885 |
| 994924 | 6/1965 | United Kingdom | 260/876 |

*Primary Examiner*—William F. Hamrock
*Attorney, Agent, or Firm*—Michael B. Fein

[57] ABSTRACT

A three-stage, sequentially produced graft polymer comprises (A) a non-rubbery, hard first stage polymer formed by the sequential polymerization of a monomer charge of 50 to 100 weight percent of a vinylaromatic compound, 0 to 50 weight percent of a different monovinylidene monomer interpolymerizable therewith, and 0 to 10 weight percent of a polyfunctional crosslinking monomer based on the weight of the monomer charge; (B) a second stage rubbery polymer formed by sequentially polymerizing in the presence of the hard polymer Stage (A) a second monomer charge of 50 to 100 weight percent of butadiene, isoprene, chloroprene, an alkyl acrylate or mixtures thereof wherein the alkyl group of the alkyl acrylate has about 3 to 8 carbon atoms, 0 to 50 weight percent of a monovinylidene monomer interpolymerizable therewith, and 0 to 10 weight percent of a polyfunctional crosslinking agent; and (C) a third stage polymer formed by sequentially polymerizing in the presence of the Stage (A) and Stage (B) polymer product a monomer charge of 50 to 100 weight percent of an alkyl methacrylate wherein the alkyl group has about 1 to 4 carbon atoms, 0 to 50 weight percent of a vinylidene monomer interpolymerizable therewith, and 0 to 10 weight percent of a polyfunctional crosslinking monomer, and/or 0 to 1.0 weight percent of an alkyl mercaptan of 3 to 12 carbon atoms. Preferably the polymer is used as a modifier for vinyl halide polymers. When so used, the refractive index of the first two stages of the graft polymer is substantially equal to the refractive index of the vinyl halide polymer.

14 Claims, No Drawings

VINYL HALIDE POLYMER IMPACT MODIFIERS

This application is divisional of Ser. No. 494,810 filed Aug. 5, 1974, now U.S. Pat. No. 3,971,835, which is in turn a continuation of Ser. No. 184,913, filed Sept. 29, 1971, now abandoned, which was in turn a continuation-in-part of Myers et al., United States Ser. No. 56,007, filed July 17, 1970, now abandoned.

Vinyl halide polymers are a class of materials well known in the art, and are widely used for their excellent balance of physical properties, economy, and availability. Included are homopolymers and copolymers of vinyl halides generally, and particularly the polymers and copolymers of vinyl chloride. The copolymers contemplated in the art by the expression vinyl halide copolymers typically comprise the polymers resulting from the polymerization of a monomer mixture comprising at least 80% by weight of a polyvinyl halide with up to about 20% by weight of another monovinylidene compound copolymerizable therewith, such as vinyl acetate, vinylidene chloride and propylene, or the like.

Rigid and semi-rigid or lightly plasticized vinyl products and compositions have had an impressive growth in the plastics industry during the last few years. In part at least, this growth has been facilitated by the advent and commercialization of modifiers for vinyl chloride resins which have the ability to improve processing characteristics, increase impact strength and develop other useful utilities in the basic vinyl chloride resin system. The present invention relates to a three-stage sequentially produced graft polymer which imparts improved impact resistance and clarity to vinyl halide polymer compositions.

Itimeri, U.S. Pat. No. 3,288,886, shows vinyl halide polymer compositions containing a graft copolymer of a rubbery polymer of butadiene or butadiene and styrene and monomers of styrene and methyl methacrylate where the graft copolymer is produced by completely polymerizing the styrene in the presence of an aqueous dispersion of the rubbery polymer followed by polymerization of the methyl methacrylate.

British Pat. No. 1,159,689 (Kureha) discloses copolymers produced by graft polymerizing one or more vinyl or vinylidene monomers such as styrene, acrylonitrile or methyl methacrylate onto a rubber-like polymer latex. The British patent specification is particularly directed to producing a butadiene-styrene-methyl methacrylate crosslinked copolymer by polymerizing a styrene, methyl methacrylate and a crosslinking agent in the presence of a latex of polybutadiene or a butadiene-styrene copolymer. Japanese Patent Publication No. 23326/68, relates to vinyl chloride resin compositions containing a polymer obtained by the graft polymerization of 1,3-butadiene monomer in the presence of methyl methacrylate polymer and by the further polymerization of a monomer mixture of styrene and acrylonitrile. Ryan et al., U.S. Pat. No. 3,426,101, discloses polymers produced by the sequential polymerization of (1) alkyl esters of acrylic acid (2) styrene and (3) lower alkyl esters of methacrylic acid and high impact-resistant and transparent materials which result from blending such products with homopolymers and copolymers of vinyl chloride.

It has been found in the present invention, that modifiers for vinyl halide polymers can be made by first forming a non-rubbery, hard polymer core of a polyvinylaromatic compound, particularly polystyrene, then forming a rubbery polymer stage physically entangled on and/or within and chemically bonded to the hard polymer core and comprising butadiene, isoprene or a lower alkyl acrylate, and finally forming a third stage substantially encapsulating the first two stages and chemically bonded thereto and comprising an alkyl methacrylate. It has been found that vinyl halide polymers containing these modifiers are characterized by improved impact resistance and clarity.

The present invention relates to a process for making this sequential emulsion polymerized modifier, compositions of the resulting modifiers and vinyl halide polymers containing the modifier. The process comprises the steps: (a) forming a non-rubbery, hard polymer stage by emulsion polymerization of a monomer charge of 50 to 100 weight percent of a vinylaromatic compound, 0 to 50 weight percent of a different monovinylidene monomer interpolymerizable therewith, and 0 to 10 weight percent of a polyfunctional crosslinking monomer based on the weight of the monomer charge; (B) adding to the resulting non-rubbery, hard polymer stage produced in Step (A), a second monomer charge of 50 to 100 weight percent of butadiene, isoprene, chloroprene, an alkyl acrylate or mixtures thereof wherein the alkyl group of the alkyl acrylate has about 3 to 8 carbon atoms, 0 to 50 weight percent of a monovinylidene monomer interpolymerizable therewith, and 0 to 10 weight percent of a polyfunctional crosslinking monomer, weights based on the total weight of the Step (B) monomer charge; and emulsion polymerizing the second monomer charge to form a rubbery polymer stage; and (C) adding to the resulting polymer produced in Steps (A) and (B), a third monomer charge of 50 to 100 weight percent of an alkyl methacrylate wherein the alkyl group has about 1 to 4 carbon atoms, 0 to 50 weight percent of a vinylidene monomer interpolymerizable therewith, and 0 to 10 weight percent of a polyfunctional crosslinking and/or 0 to 1.0 weight percent of an alkyl mercaptan of 3 to 12 carbon atoms, weights based on the total weight of the Step (C) monomer charge; and emulsion polymerizing the third monomer charge to form a third stage polymer substantially physically entangled on and/or within the polymer produced in Steps (A) and (B).

The composition is a three-stage, sequentially produced polymer comprising (A) a non-rubbery, hard polymer stage formed by the sequential polymerization of a monomer charge of 50 to 100 weight percent of a vinylaromatic compound, 0 to 50 weight percent of a different monovinylidene monomer interpolymerizable therewith, and 0 to 10 weight percent of a polyfunctional crosslinking monomer based on the weight of the monomer charge; (B) a second stage rubbery polymer formed by sequentially polymerizing in the presence of the first stage polymer (A), a second monomer charge of 50 to 100 weight percent of butadiene, isoprene, chloroprene, an alkyl acrylate or mixtures thereof wherein the alkyl group of the alkyl acrylate has about 3 to 8 carbon atoms, 0 to 50 weight percent of a monovinylidene monomer interpolymerizable therewith, and 0 to 10 weight percent of a polyfunctional crosslinking agent, weights based on the total weight of the Step (B) monomer charge; and (C) a third stage polymer formed by sequentially polymerizing in the presence of the Stage (A) and Stage (B) polymer product a monomer charge comprising 50 to 100 weight percent of an alkyl methacrylate wherein the alkyl group has about 1 to 4 carbon atoms, 0 to 50 weight percent of a vinylidene monomer interpolymerizable therewith, and/or 0 to 10 weight percent of a polyfunctional crosslinking agent or 0 to 1.0 weight percent of an alkyl mercaptan of 3 to 12 carbon atoms based on the total weight of the Step (C) monomer charge.

The compositions of vinyl halide polymer containing the modifier comprise about 98 to 60 weight percent poly(vinyl halide) and about 2 to 40 weight percent of the three stage, sequentially produced polymer described above and further characterized in that the refractive index of the graft polymer is substantially equal to the refractive index of the poly(vinyl halide).

In the first stage of the process, a vinyl aromatic compound such as styrene, containing a small amount of a crosslinking monomer, preferably difunctional vinyl monomers such as a divinylbenzene, diallyl maleate, or allyl methacrylate is polymerized to form a hard polymer product which forms the core for the polymerization of the succeeding stages. The polymerization is conducted in the presence of a suitable emulsifier and an initiating system. The vinyl aromatic compound is one which is readily polymerizable in emulsion by free radical techniques. Styrene is preferred, but ring-substituted styrenes such as vinyl toluene, p-isopropylstyrene, 3,4-dimethylstyrene, etc., as well as halogen substituted derivatives such as p-bromostyrene, 3,4-dichlorostyrene, etc. can also be used. Although suitably 50 to 100 weight percent of the first Step (A) monomers consists of vinyl aromatic compound, 80 to 100 weight percent is a preferred range.

Part of the styrene (or ring-substituted styrene), up to a maximum of about 50 percent by weight, can be replaced with a non-crosslinking (with respect to the styrene) monovinylidene monomer interpolymerizable therewith. Examples of vinylidene monomers interpolymerizable or copolymerizable with the styrene are acrylonitrile, vinyl esters, alkyl methacrylic esters, methacrylic and acrylic acids, acrylic acid esters, etc. If a vinylidene monomer is included among the monomers polymerized in Step (A), preferably the vinylidene monomer is present in quantities of 5 to 20 weight percent of the total weight of monomers in the Step (A) charge.

A Crosslinking, bi- or polyfunctional monomer may be used in the first stage to crosslink the styrene or similar material. The range of 0.1 to 10.0 percent by weight of the crosslinking monomer based on the styrene is satisfactory, with 0.2 to 6.0 percent by weight being preferred. Crosslinkers that can be used in the present invention include divinyl esters of di- or tribasic acids, such as divinyl adipate; dialkyl esters of polyfunctional acids such as dialkyl phthalate; diallyl esters of polyfunctional acids, such as diallyl maleate and diallyl fumarate; divinyl esters of polyhydric alcohols, such as divinyl ether of ethylene glycol; and di- and trimethacrylic and acrylic esters of polyhydric alcohols; for example, ethylene glycol dimethacrylate, propylene glycol dimethacrylate, 1,3-butylene glycol dimethacrylate, 1,4-butylene glycol dimethacrylate; etc. and mixtures of any of the foregoing.

In the second stage, the butadiene, isoprene, chloroprene, alkyl acrylate or mixtures thereof is polymerized in the presence of the first stage. This second stage polymerization forms a rubbery polymer stage physically entangled on and/or within and at least in part chemically bonded to the hard polymer formed by the first stage polymerization. During the second stage, additional initiator may be added, but essentially no new, additional and distinct particles are produced. Suitable monomers for forming the second stage include butadiene, isoprene, chloroprene, butadiene and styrene, butadiene and isoprene, alkyl acrylates containing 3 to 8 carbon atoms in the alkyl group or mixtures of any of the preceeding. The alkyl group can be a straight or branched chain. Preferred alkyl acrylates are n-butyl acrylate, 2-ethylhexyl acrylate, ethyl acrylate, isobutyl acrylate and 2-methoxyethyl acrylate. Polymers formed in this stage must have a glass transition temperature of $-22°$ C. or below (e.g., $-35°$ C., $-40°$ C., etc.). Although suitably 50 to 100 weight percent of the Step (B) monomers consists of butadiene, isoprene, chloroprene, the alkyl acrylate or mixtures thereof, 80 to 100 weight percent is a preferred range.

Part of the alkyl acrylate or corresponding monomer, up to a maximum of about 50 percent by weight, can be replaced with a non-crosslinking (with respect to the alkyl acrylate or corresponding monomer) monovinylidene monomer interpolymerizable therewith. Examples of vinylidene monomers interpolymerizable or copolymerizable with the monomers of this stage are acrylonitrile, vinyl esters, alkyl methacrylic esters, methacrylic and acrylic acids, styrene and the like. If a vinylidene monomer is included among the monomers polymerized in Step (B), preferably the vinylidene monomer is present in quantities of 5 to 20 weight percent of the total weight of monomers in the Step (B) charge.

The second stage monomer mixture may also contain a crosslinking bi- or polyfunctional monomer such as that used in the first stage. If butadiene or isoprene is used in the second stage, the crosslinking agent may not be needed; if alkyl acrylate is used, a crosslinking agent should be present. Again the range of 0 to 10.0 percent by weight of the crosslinking monomer based on the weight of the second stage monomer mixture is satisfactory with 0.2 to 6.0 percent by weight being preferred whenever a crosslinking monomer is included. Suitable crosslinkers include the divinyl esters of di- or tribasic acids, such as divinyl adipate; dialkyl esters of polyfunctional acids, such as dialkyl phthalate, diallyl esters such as diallyl maleate, or diallyl fumarate; divinyl ethers of polyhydric alcohols, such as the divinyl ether of ethylene glycol; and di- and tri- methacrylate and acrylic esters of polyhydric alcohols; for example, ethylene glycol dimethacrylate, propylene glycol dimethacrylate, 1,3-butylene glycol dimethacrylate, 1,4-butylene glycol dimethacrylate, etc. and mixtures of any of the foregoing.

After completion of the second stage polymerization, a lower alkyl methacrylate is added and polymerized in the presence of the two-stage emulsion; essentially no new additional and distinct particles are formed in this stage. More initiator may be used if desired. The resultant solid, polymeric product may be isolated from the emulsion by evaporation, by suitable coagulation and washing, such as by salt coagulation, freezing, etc., or it may be isolated as by spray drying.

The preferred alkyl methacrylate for the third stage is methyl methacrylate, but generally, any lower alkyl ester of methacrylic acid in which the lower alkyl group has a value of $C_1$ to $C_4$ may be used. Preferably, the lower alkyl methacrylate monomer used is one the homopolymer or copolymer of which has a glass transition temperature of 60° C. or higher. Suitable examples, in addition to methyl methacrylate, are ethyl methacrylate, isopropyl methacrylate, sec.-butyl methacrylate, tert.-butyl methacrylate and the like. The hard phase polymeric methacrylate comprises a cover or layer for the inner mass and imparts compatibility to the product with vinyl halide polymers such as polyvinyl chloride. It is important that this methyl methacrylate monomer-containing third stage have a viscosity average molecular weight in the range of 25,000 to one million. Preferably the molecular weight is 50,000 to 500,000. Although suitably 50 to 100 weight percent of the Step (C) monomers consist of alkyl methacrylate, 80 to 100 weight percent is a preferred range.

Part of the lower alkyl methacrylate, up to a maximum of about 50 percent by weight, can be replaced with a non-crosslinking monovinylidene monomer interpolymerizable therewith. Examples of vinylidene monomers interpolymerizable or copolymerizable with the lower alkyl methacrylate are acrylonitrile, vinyl esters, alkyl acrylic ester, higher methacrylic acid esters such as isobornyl methacrylate, methacrylic and acrylic acids, styrene and the like. If a monovinylidene monomer is included among the monomers polymerized in Step (C), preferably the monovinylidene monomer is present in quantities of 5 to 20 weight percent of the total weight of monomers in the Step (C) charge.

The third stage monomer mixture may also contain a crosslinking bi- or polyfunctional monomer such as that used in the first stage. If alkyl acrylate is used, a crosslinking agent should be present. Again the range of 0 to 10.0 percent by weight of the crosslinking monomer based on the weight of the third stage monomer mixture is satisfactory with 0.2 to 6.0 percent by weight being preferred whenever a crosslinking monomer is included. Suitable crosslinkers include the divinyl esters of di- or tribasic acids, such as divinyl adipate; dialkyl esters of polyfunctional acids, such as dialkyl phthalate; diallyl esters such as diallyl maleate, or diallyl fumarate; divinyl ethers of polyhydric alcohols, such as the divinyl ether of ethylene glycol; and di- and trimethacrylic acid and acrylic esters of polyhydric alcohols; for example ethylene glycol dimethacrylate, propylene glycol dimethacrylate, 1,3-butylene glycol dimethacrylate, 1,4-butylene glycol dimethacrylate, etc. and mixtures of any of the foregoing.

The third stage monomer mixture may also contain 0 to 1.0 weight percent alkyl mercaptan of 3 to 12 carbon atoms. Preferably the mixture contains 0.01 to 0.5 weight percent of the alkyl mercaptan with preferred mercaptans being sec.-butyl mercaptan, n- and ter.-dodecyl mercaptan.

Any of a variety of common emulsifiers well known in the art for emulsion polymerization of styrene, acrylates, and methacrylates can be used in the present invention. A low level of emulsifier is desirable, preferably below one percent by weight based on the total weight of polymerizable monomers charged in all stages. Useful emulsifying agents include common soaps, alkylbenzenesulfonates, such as sodium dodecylbenzene sulfonate, alkylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8–22 carbon atoms coupled to high polar solubilizing groups such as alkali metal and ammonium carboxylate groups, sulfate half ester groups, sulfonate groups, phosphate partial ester groups and the like.

The polymerization medium in each stage or step may contain a free radical generating polymerization initiator, which is activated either thermally or by an oxidation-reduction (redox) reaction. The preferred initiators are those which are the result of redox reactions, since they allow rapid polymerization at low reaction temperatures. Examples of suitable initiators are combinations such as cumene hydroperoxide-sodium metabisulfite, diisopropylbenzene hydroperoxide-sodium formaldehyde sufloxylate, tertiary butyl peracetatesodium hydrosulfite, cumene hydroperoxide-sodium formaldehyde sulfoxylate, etc. Water-soluble initiators may also be used, although less desirable; examples of such initiators or initiator combinations are sodium persulfate, potassium persulfate-sodium formaldehyde sulfoxylate, etc.

In order to achieve the improved transparency of the present invention, the refractive index of the sequential polymer is substantially matched to the refractive index of the vinyl halide polymer. Generally this is achieved by utilizing relative proportions of the major constituents of the modifier within the range of 5 to 50 parts of the first Stage (A) monomers, 20 to 70 parts of the second Stage (B) rubbery polymer-forming monomers, and 15 to 40 parts of the third Stage (C) monomers, all parts being by weight. When a modifier having a small proportion of first stage is used, the preferred proportions of stages are 5 to 25 parts first stage, 40 to 70 parts second stage and 20 to 35 parts third stage. When a modifier having a larger proportion of first stage is used, the preferred range is 25 to 50 parts first stage monomers, 20 to 40 parts of the second stage rubbery polymer forming monomers, and 15 to 35 parts of the third stage monomers, all parts being by weight and based on 100 parts of the three stages.

One important feature of the present invention is the average particle size of the sequentially produced polymer which should be at least smaller than about 3000 Å in diameter. It has been found that sheets of polyvinyl halide compositions containing the modifiers of the present invention are hazy or opaque if the particle size of the modifier is greater than about 1100 Å. If clear polyvinyl halide sheets are desired, this particle size limitation takes on a critical aspect. Preferably the range of particle size diameters is from 700 to 1100 Å. Otherwise if a hazy or opaque sheet is useable in the particular application contemplated, a suitable range of particle size diameters for modifiers of the present invention is 700 to 3000 Å.

Particle size of the compositions of this invention may be controlled by controlling the size of the first stage particles. Control of particle size in the first stage is achieved by rapid agitation to cause dispersion of catalyst. Emulsifier and/or catalyst may also be used to control the first stage particle size.

The thermoplastic vinyl halide polymers utilized in the preferred embodiment of the present invention are the polymers and copolymers of vinyl halides, preferably chlorides, widely utilized in the production of plastic articles. These polymers are referred to as vinyl halide or vinyl chloride polymers in the present invention, and for most all uses must be modifiers compounded or copolymerized with other materials to provide processable and useful compositions. For the purpose and scope of this specification the term "vinyl chloride polymers" or "compositions" will include all compositions which have vinyl chloride or other halide as the major (greater than 50%) component monomer. The compositions include, but are not limited to: poly(vinyl chloride) [PVC], copolymers of vinyl chloride with other monomers that include vinyl alkanoates such as vinyl acetate and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like; for flexibility vinyl halide polymers are often compounded with plasticizers such as dioctyl phthalate, poly(propylene adipate) and the like, and other modifiers such as chlorinated polyethylene; and many other materials are often included. The molecular weight and molecular weight distribution of the polymers is not critical to the aims, purposes and results of using this invention. For general applications vinyl chloride polymers with Fikentscher K-values in the range of 40 to 95, preferably about 50 to 75, are generally used. The Fikentscher K-value is determined by the formula $$\frac{Log[\eta] \, rel}{C} = \frac{75 \times 10^{-6} K^2}{1 + 1.5 \times 10 - 3KC} + 10^{-3} K$$

where

C is 0.5 gm/100 ml. concentration of polymer in solvent, $[\eta]$ rel is relative viscosity in cyclohexanone at 25° C. and K is Fikentscher value.

When copolymers of vinyl chloride are utilized in the practice of the present invention, it is usually preferable to utilize a polymer containing from 0 to 15 weight percent of comonomer. The preferred comonomer is preferably the vinyl alkanoate, and is most preferably vinyl acetate. The most preferable copolymer contains up to 10 weight percent of the comonomer, with the remainder being vinyl chloride.

The copolymers of vinyl chloride and another monomer, mentioned above, are often softer than homopolymers of vinyl chloride.

Finally, the most preferred polymer, and the polymer which is most effectively modified by the composite interpolymers of the present invention is the homopolymer of vinyl chloride.

The above copolymers vary in physical characteristics such as viscosity, and molecular weight. The copolymers generally are of slightly lower molecular weights than PVC. Also, the viscosity values are often slightly lower, although generally within the above range. These differences however, are not limiting to the present invention which is directed to modifying such polymers and not the polymers themselves. The polymers, however, as is obvious, must be suitable for the use desired when modified, and physically must be of a type to which the present modifiers can be added.

Blends of the modifier and the vinyl halide polymer can be accomplished by any convenient technique. Entirely satisfactory blends can be accomplished on a roll mill at convenient and customary operating conditions, such as about 350° F. in about 5 to 15 minutes time. Dry mixing techniques, as with a mechanical mixer-blender device, can also be employed. The powder blends can, if desired, be processed in commercial extrusion equipment at conditions varying with the molecular weight of the polyvinyl halide used and the equipment employed for that purpose.

Certain processing aids, stabilizers, etc. are often incorporated in the blends. The stabilizers, which serve to prevent the breakdown of the polyvinyl chloride, are of several different types commonly available and well known in the art. Some help to stabilize against heat degradation; some against ultra-violet light, etc. Typically, such stabilizers are based upon tin, barium or cadmium compounds, as will be seen from the examples below. In those situations where clarity is not necessary, common pigments may be incorporated in the modifier-vinyl halide polymer systems.

Although the emulsion polymers of the present invention have been described with reference to their preferred utility as modifiers for vinyl halide polymers, the polymers are useful as impact modifiers for other thermoplastic polymer substrates such as substrates derived from polycarbonates, polystyrenes, cellulose acetate-butyrate polymers, acrylic polymers such as methyl methacrylate-containing copolymers and acrylonitrile-butadiene-styrene copolymers. The polymers of the present invention are also useful for forming films.

To assist those skilled in the art in the practice of the present invention, the following modes of operation are set forth as illustrations, parts and percentages being by weight unless otherwise noted. The following indicated abbreviations are used; styrene (S), divinylbenzene (DVB), butyl acrylate (BA), 1,3-butylene glycol diacrylate (BDA), methyl methacrylate (MMA); a single slash (/) is used to divide monomers of the same stage and a double slash (//) separates different stages of the sequentially produced polymers.

EXAMPLE I

To a suitable reaction vessel equipped with stirrer, degassing tube, thermometer and addition funnel are charged in the order following; 5400 parts distilled water, 190 parts of a 20% aqueous solution of sodium lauryl sulfate, 65 parts diallyl maleate and 200 parts styrene. The pH of the reaction mixture is adjusted to acid, the mixture is sparged with nitrogen for two hours, the temperature is adjusted to 35° C. and catalyst and 200 parts water are needed. An exotherm occurs and reaches a peak temperature of 73° C. in 45 minutes. The temperature of the reaction emulsion is maintained at this peak for a period of 15 additional minutes. An additional 40 parts of a 20% aqueous solution of sodium lauryl sulfate is then added followed by 8000 parts by water. The diluted emulsion is sparged with nitrogen for one hour. The temperature is adjusted to 60° C. and additional catalyst and 200 parts of water are added. Butyl acrylate, 2000 parts, and 1,3-butylene diacrylate, 12 parts, are added while the emulsion is sparged with nitrogen. Over this period a slow exotherm occurs and reaches a peak temperature of 67° C. when the addition is complete. The emulsion is maintained at this peak temperature for one hour. The temperature is then readjusted to 60° C., and additional catalyst and water are added, followed by the addition of 2000 parts methyl methacrylate and 2 parts sec.-butyl mercaptan. The emulsion is sparged during the addition of the monomers. A slow exotherm occurs and reaches a peak temperature of 67° C. The temperature is maintained at this peak for one hour. The emulsion is then cooled and filtered. The resulting polymer is isolated from its emulsion by spray drying. It may also be isolated or separated by evaporation or by coagulation.

The three stage, sequential polymer produced above is blended along with suitable lubricants and stabilizers, with a polyvinyl chloride, K value = 62; $\overline{M}_n$ = 50,000; $[\eta]_{rel}^{25°\,C.}$ = 2.03. The resulting blend is mixed and milled for 5 minutes at 350° F. after fluxing. Sheets are formed by compression molding at 350° F. using a cycle of 3 minutes preheat and two minutes of 70 tons pressure. The sheets are cooled in a separate water cooled press under pressure. Properties of various modified polyvinyl chloride sheets of the present invention are set out in the following Table I. Testing is done by standard methods: light transmission and haze are determined on ⅛ inch thick sheets.

Table I

| Weight Percent Modifier | Izod Impact Strength (ft. lbs./inch of notch) | | | Light Transmission | | Haze |
|---|---|---|---|---|---|---|
| | 80° F. | 73° F. | 60° F. | Percent Total | Percent Scatter | |
| None | 0.9, 0.9 | 1.0, 0.7 | 0.6, 0.5 | 86.2 | 6.7 | 7.8 |
| 20.0 | 26.6, 25.4 | 20.3, 16.1 | 1.4, 1.2 | 84.5 | 4.3 | 5.1 |
| 20.0 | 26.4, 16.8 | 17.9, 12.9 | 2.1, 1.0 | 84.5 | 5.0 | 5.9 |
| 22.5 | 26.5, 26.6 | 16.0, 15.7 | 1.2, 1.0 | 83.5 | 5.0 | 6.6 |
| 22.5 | 27.0, 25.7 | 21.5, 4.7 | 1.9, 2.4 | ·84.6 | 5.6 | 6.6 |

This example shows that polyvinyl chloride compositions modified per the present invention exhibit substantially improved properties.

EXAMPLE II

Using the procedure of Example I, a three stage, sequential graft polymer of the following composition is produced:

first stage 45 parts styrene
1.5 parts diallyl maleate second stage 30 parts butyl acrylate
1 part diallyl maleate third stage 20 parts methyl methacrylate The polymer produced is blended with polyvinyl chloride as per the procedure of Example I. Samples of resulting blend exhibit properties equal to or superior to those of the compositions of Table I.

EXAMPLE III

Using the procedure of Example I, a three stage, sequential graft polymer of the following composition is produced:

first stage 8 parts styrene
0.5 parts divinylbenzene
0.5 parts diallyl maleate second stage 45 parts butadiene
18 parts styrene
1 part methyl methacrylate third stage 24 parts methyl methacrylate
2.7 parts ethyl acrylate
0.3 parts 1,3-butylene glycol dimethacrylate The polymer produced is blended with polyvinyl chloride as per the procedure of Example I. The resulting PVC composition exhibits improved resistance to crease-whitening. Properties of the resulting modified polyvinyl chloride compared to immodified polyvinyl chloride are given in the following Table II:

Table II

| Weight Percent Modifier | Izod Impact Strength (ft.lbs./inch of notch) | | Clarity | | Color |
|---|---|---|---|---|---|
| | 73° F. | 50° F. | Percent White LIght Transmission | Percent Haze | |
| none | 0.9 | 0.8 | 90.5 | 5.0 | neutral |
| 20.0 | 24.6 | 23.4 | 79.0 | 5.6 | yellow |

EXAMPLE IV

This example compares compositions of the present invention with polyvinyl chloride compositions containing modifiers produced by a polymerization sequence wherein a soft stage polymer is first prepared followed by the polymerization of a hard stage in the presence of the first stage.

The three-stage sequential polymers of the Table III are prepared, incorporated into polyvinyl chloride and tested according to the procedures of Example I:

Table III

| Modifier | Izod Impact | | Clarity | |
|---|---|---|---|---|
| | 10% Modifier | 20% Modifier | Precent White Light Transmission | Percent Haze |
| S/DVB//BA/BDA//MMA 34.3/.7//34.3/.7//30 | 15.8* | 25.4 23.3* | 72.0 75.5 | 17.8 13.6 |
| BA/BDA//S/DVB//MMA 34.3/.7//34.3/.7//30 | 4.3 | 4.7 3.2 | 36.0 36.4 | 68.1 63.1 |

*Scattered values

What is claimed is:

1. A composition comprising a three stage, sequentially produced graft polymer comprising
(A) 5 to 50 parts by weight of a first non-rubbery, hard polymer stage formed by polymerization of a monomer charge of 50 to 100 weight percent of a vinylaromatic compound and 0.1 to 10 weight percent of a polyfunctional crosslinking monomer based on the weight of the monomer charge;
(B) 20 to 75 parts by weight of a second stage rubb polymer formed by sequentially polymerizing in the presence of first non-rubbery hard polymer stage a second monomer charge of to 100 percent of butadiene, isoprene, or chloroprene, or mixtures thereof, or an alkyl acrylate wherein the alkyl acrylate has about 2 to 8 carbon atoms, and (C) 15 to 40 parts by weight of a third stage polymer formed by sequentially polymerizing in the presence of the Stage (B) polymer product a monomer charge of 50 to 100 weight percent of an alkyl methacrylate wherein the alkyl group has about 1 to 4 carbon atoms.

2. The composition of claim 1 comprising 5 to 25 parts of the Stage (A) polymer, 40 to 70 parts of the Stage (B) polymer and 20 to 35 parts of the Stage (C) polymer.

3. The composition of claim 1 comprising 25 to 50 parts of the Stage (A) polymer, 20 to 40 parts of the Stage (B) polymer, and 15 to 35 parts of the Stage (C) polymer.

4. The composition of claim 1 in which the polymer of Stage (B), if formed in the absence of the polymer of Stage (A), would be characterized by a glass transition temperature of $-22°$ C. or below.

5. The composition of claim 1 in which the vinylaromatic compound of Stage (A) is styrene, Stage (B) contains butadiene and Stage (C) contains methyl methacrylate.

6. The composition of claim 5 in which the Stage (A) polymer is formed from a monomer charge containing 0.2 to 6.0 percent by weight diallyl maleate.

7. The composition of claim 6 in which the Stage (B) polymer is formed from a monomer charge containing 0.2 to 6.0 percent by weight diallyl maleate.

8. The composition of claim 1 in which the range of particle size diameters for the sequentially produced graft pol is less than about 3000 Å.

9. The composition of claim 6 in which the range of particle size diameters for the sequentially produced graft polymer is 700 to 1100 Å.

10. The composition of claim 1 wherein Stage (B) further includes about 0.2 to 6.0 weight percent of a polyfunctional cross-linking monomer.

11. The composition of claim 1 wherein the Stage (C) monomer charge further includes up to 50 weight percent of a vinylidene monomer interpolymerizable therewith.

12. The composition of claim 1 wherein the Stage (C) monomer charge further includes up to 1.0 weight percent of an alkyl mercaptan of 3 to 12 carbon atoms.

13. The composition of claim 1 wherein the Stage (C) monomer charge further includes up to 10 weight percent of a polyfunctional crosslinking monomer.

14. A composition comprising a three stage, sequentially produced graft polymer comprising
(A) 5 to 50 parts by weight of a first non-rubbery, hard polymer stage formed by polymerization of a monomer charge of 50 to 100 weight percent of a vinylaromatic compound and 0.1 to 10 weight percent of a polyfunctional crosslinking monomer based on the weight of the monomer charge;
(B) 20 to 75 parts by weight of a second stage rubbery polymer formed by sequentially polymerizing in the presence of said first non-rubbery hard polymer stage a second monomer charge of 50 to 100 percent of an alkyl acrylate wherein the alkyl acrylate has about 2 to 8 carbon atoms, and
(C) 15 to 40 parts by weight of a third stage polymer formed by sequentially polymerizing in the presence of the stage (B) polymer product a monomer charge of 50 to 100 weight percent of an alkyl methacrylate wherein the alkyl group has about 1 to 4 carbon atoms.

* * * * *

UNITED STATES PATENT AND TRADEMARK OFFICE
CERTIFICATE OF CORRECTION

PATENT NO. : 4,145,380
DATED : March 20, 1979
INVENTOR(S) : Robert M. Myers, David L Dunkelberger & Daniel T. Carty It is certified that error appears in the above—identified patent and that said Letters Patent is hereby corrected as shown below:

Column 4, line 5 - change "3 to 8" to -- 2 to 8 --.

Column 5, line 67 - change "themally" to -- thermally --.

Column 8, line 44 - change word "by" to -- of --.

Table I - place (,) comma between figures "20.3" and "16.1".

Column 10, line 63 - word "rubb" should read -- rubbery --.

Column 10, line 64 - word "peresence" should read -- presence --.

Column 10, line 65 - between words "of" and "to" insert figure -- 50 --.

Column 11, line 31 - word "pol" should read -- polymer --.

Column 10, line 64, after "of" insert -- said --.

Signed and Sealed this

Twenty-third Day of October 1984

[SEAL]

Attest:

GERALD J. MOSSINGHOFF

Attesting Officer

Commissioner of Patents and Trademarks